(12) United States Patent
Hancock et al.

(10) Patent No.: US 7,239,096 B2
(45) Date of Patent: Jul. 3, 2007

(54) VEHICLE SEAT HAVING AN ELECTRONIC CONTROL SYSTEM

(75) Inventors: Robert L. Hancock, Ann Arbor, MI (US); Terrence M. Cussen, Ann Arbor, MI (US); Joseph W. McElroy, Ann Arbor, MI (US); Daniel J. Koester, Ann Arbor, MI (US); Bruno Wevers, Bloomfield, MI (US)

(73) Assignee: Johnson Controls Technology Company, Holland, MI (US)

( * ) Notice: Subject to any disclaimer, the term of this patent is extended or adjusted under 35 U.S.C. 154(b) by 336 days.

(21) Appl. No.: 10/501,372

(22) PCT Filed: Feb. 12, 2003

(86) PCT No.: PCT/US03/04085

§ 371 (c)(1),
(2), (4) Date: Jul. 14, 2004

(87) PCT Pub. No.: WO03/068552

PCT Pub. Date: Aug. 21, 2003

(65) Prior Publication Data

US 2005/0006939 A1  Jan. 13, 2005

Related U.S. Application Data

(60) Provisional application No. 60/356,277, filed on Feb. 12, 2002.

(51) Int. Cl.
*H02P 5/46* (2006.01)
*B60N 2/02* (2006.01)

(52) U.S. Cl. .............................. 318/59; 318/50; 318/68

(58) Field of Classification Search .................. 318/34, 318/38, 41, 49, 50, 53, 59, 66–68, 75, 77, 318/80, 82, 83, 105, 109, 112
See application file for complete search history.

(56) References Cited

U.S. PATENT DOCUMENTS 2,843,195 A    7/1958   Barvaeus
3,695,706 A   10/1972   Basher et al.

(Continued)

FOREIGN PATENT DOCUMENTS

DE         40 34 558 A1    5/1995

(Continued)

*Primary Examiner*—Bentsu Ro
(74) *Attorney, Agent, or Firm*—Foley & Lardner LLP (57) ABSTRACT

An electronic control system (24) for a vehicle seat is provided that includes a seat base (12), a seat back (14), an operator input device (30) and a control circuit (26). The seat base has a seat back motor (34) configured to move a seat base forward and backward. The seat back has a seat back motor (32) configured to adjust an angle of inclination of the seat back. The operator input (30) device is configured to received operator commands for movement of the vehicle seat. The control circuit is configured to receive the operator commands and to control the seat base motor and the seat back motor. The control circuit is also configured to move the seat base and the seat back at a ratio of approximately 1 degree of inclination to between approximately 1 mm to approximately 4 mm of forward or backward movement of the seat base.

20 Claims, 7 Drawing Sheets

U.S. PATENT DOCUMENTS

| | | |
|---|---|---|
| 3,762,769 A | 10/1973 | Poschi |
| 4,456,861 A | 6/1984 | Ratzel et al. |
| 4,463,426 A * | 7/1984 | Caddick et al. ............... 701/49 |
| 4,523,136 A * | 6/1985 | Dudeck et al. .......... 318/568.1 |
| 4,547,718 A | 10/1985 | Ratzel et al. |
| 4,580,840 A | 4/1986 | Cunningham et al. |
| 4,583,783 A | 4/1986 | Kanai |
| 4,601,514 A | 7/1986 | Meiller |
| 4,689,537 A | 8/1987 | Mizuta et al. |
| 4,717,203 A | 1/1988 | Meiller |
| 4,852,934 A | 8/1989 | Yasuda et al. |
| 4,881,020 A | 11/1989 | Hida et al. |
| 5,026,116 A | 6/1991 | Dal Monte |
| 5,038,085 A | 8/1991 | Gmeiner et al. |
| 5,050,930 A | 9/1991 | Schuster et al. |
| 5,097,185 A * | 3/1992 | Ogasawara ................. 318/268 |
| 5,126,640 A | 6/1992 | Leroy |
| 5,174,526 A | 12/1992 | Kanigowski |
| 5,207,451 A | 5/1993 | Furuse et al. |
| 5,249,839 A | 10/1993 | Faiks et al. |
| 5,253,138 A | 10/1993 | Droulon et al. |
| 5,292,178 A | 3/1994 | Loose et al. |
| 5,295,730 A | 3/1994 | Rees |
| 5,319,248 A | 6/1994 | Endou |
| 5,328,248 A | 7/1994 | Nishiyama |
| 5,385,388 A | 1/1995 | Faiks et al. |
| 5,397,164 A | 3/1995 | Schuster et al. |
| 5,435,624 A | 7/1995 | Bray et al. |
| 5,452,868 A | 9/1995 | Kanigowski |
| 5,497,326 A | 3/1996 | Berland et al. |
| 5,498,063 A | 3/1996 | Schuster et al. |
| 5,536,069 A | 7/1996 | Bray et al. |
| 5,597,205 A | 1/1997 | Glance et al. |
| 5,602,425 A | 2/1997 | Wilhelmi et al. |
| 5,626,390 A | 5/1997 | Schuster et al. |
| 5,636,898 A | 6/1997 | Dixon et al. |
| 5,717,300 A | 2/1998 | Baloche et al. |
| 5,748,473 A | 5/1998 | Breed et al. |
| 5,772,281 A | 6/1998 | Massara |
| 5,775,773 A | 7/1998 | Schuster et al. |
| 5,812,399 A | 9/1998 | Judic et al. |
| 5,864,105 A | 1/1999 | Andrews |
| 5,871,258 A | 2/1999 | Battey et al. |
| 5,887,949 A | 3/1999 | Kodaverdian |
| 5,903,122 A * | 5/1999 | Mesnage et al. ............ 318/469 |
| 5,909,923 A | 6/1999 | DeKraker |
| 5,975,634 A | 11/1999 | Knoblock et al. |
| 5,979,984 A | 11/1999 | DeKraker et al. |
| 6,003,941 A | 12/1999 | Schuster, Sr. et al. |
| 6,030,043 A | 2/2000 | Habedank |
| 6,055,473 A | 4/2000 | Zwolinski et al. |
| 6,064,932 A | 5/2000 | Francois |
| 6,079,785 A | 6/2000 | Peterson et al. |
| 6,086,153 A | 7/2000 | Heidmann et al. |
| 6,088,640 A | 7/2000 | Breed |
| 6,116,695 A | 9/2000 | Heidmann et al. |
| 6,157,372 A | 12/2000 | Blackburn et al. |
| 6,179,384 B1 | 1/2001 | DeKraker et al. |
| 6,195,603 B1 | 2/2001 | Gauger et al. |
| 6,220,661 B1 | 4/2001 | Peterson |
| 6,231,125 B1 | 5/2001 | Maeda et al. |
| 6,254,126 B1 | 7/2001 | Bauer et al. |
| 6,254,187 B1 | 7/2001 | Schuster, Sr. et al. |
| 6,318,800 B1 | 11/2001 | DeKraker et al. |
| 6,349,992 B1 | 2/2002 | Knoblock et al. |
| 6,367,877 B1 | 4/2002 | Knoblock et al. |
| 6,378,949 B1 | 4/2002 | Maeda et al. |
| 6,382,719 B1 | 5/2002 | Heidmann et al. |
| 6,394,545 B2 | 5/2002 | Knoblock et al. |
| 6,394,546 B1 | 5/2002 | Knoblock et al. |
| 6,394,548 B1 | 5/2002 | Battey et al. |
| 6,394,549 B1 | 5/2002 | DeKraker et al. |
| 6,428,104 B1 | 8/2002 | Sakamoto et al. |
| 6,435,618 B1 | 8/2002 | Kawasaki |
| 6,460,934 B1 | 10/2002 | Langer et al. |
| 6,590,354 B2 * | 7/2003 | Hein ........................... 318/34 |
| 6,616,228 B2 | 9/2003 | Heidmann |
| 6,676,218 B2 | 1/2004 | Fujita et al. |
| 6,677,720 B2 | 1/2004 | Fraser |
| 6,682,144 B2 | 1/2004 | Klingler |
| 6,722,742 B2 | 4/2004 | Potes et al. |
| 6,749,261 B2 | 6/2004 | Knoblock et al. |
| 6,991,291 B2 | 1/2006 | Knoblock et al. |
| 7,114,777 B2 | 10/2006 | Knoblock et al. |
| 7,118,178 B2 | 10/2006 | Daniels |
| 2002/0089223 A1 | 7/2002 | Yu |
| 2002/0195853 A1 | 12/2002 | Heidmann |
| 2004/0124679 A1 | 7/2004 | Teppo et al. |

FOREIGN PATENT DOCUMENTS

| | | |
|---|---|---|
| DE | 196 49 587 A1 | 6/1998 |
| DE | 198 28 217 A1 | 7/1999 |
| EP | 0 423 079 A1 | 4/1991 |
| EP | 0 458 000 A1 | 11/1991 |
| GB | 2 013 487 A | 8/1979 |
| JP | 58-76336 A | 5/1983 |
| JP | 63-232046 A | 9/1988 |
| WO | WO 2004/062961 A1 | 7/2004 |

* cited by examiner

VEHICLE SEAT HAVING AN ELECTRONIC CONTROL SYSTEM

BACKGROUND

Vehicle seats are often adjustable so that various drivers, passengers, and other users can adjust the seat to the individual's desires. Vehicle seats can be adjusted in a number of ways. One of the simplest ways to adjust a vehicle seat is by reclining. Another way to adjust the seat is by moving it forward or backward with respect to a fixed object such as, for example, a dashboard or a steering wheel. Providing the user with the option of adjusting the vehicle seat as described, allows the user greater flexibility as well as making the vehicle compatible with a larger number of users.

Often when a user adjusts a vehicle seat by, for example, reclining or inclining, the user will move toward or away from the steering wheel or dashboard. Typically, after reclining or inclining the vehicle seat, the user will want to adjust the seat forward or backward so that the user is brought back to his or her original position in relation to the steering wheel or dashboard. Unfortunately, this process has a number of disadvantages. For example, if the user is operating the vehicle while adjusting the seat, the user is not focusing on the task of operating the vehicle. The more time the user is spending adjusting the seat, the longer the user is distracted. Also, many times it is difficult for the user to gauge where the user's original position was in relation to the steering wheel or other fixed object.

SUMMARY OF THE INVENTION

According to one exemplary embodiment, an electronic control system for a vehicle seat is provided that includes a seat base, a seat back, an operator input device and a control circuit. The seat base has a seat back motor configured to move a seat base forward and backward. The seat back has a seat back motor configured to adjust an angle of inclination of the seat back.

The operator input device is configured to received operator commands for movement of the vehicle seat. The control circuit is configured to receive the operator commands and to control the seat base motor and the seat back motor. The control circuit is also configured to move the seat base and the seat back at a ratio of approximately 1 degree of inclination to between approximately 1 mm to approximately 4 mm of forward or backward movement of the seat base.

According to another exemplary embodiment, an electronic control system for a vehicle seat includes a seat base, a seat back, an operator input device and a control circuit. The seat base has a seat back motor configured to move a seat base forward and backward. The seat back has a seat back motor configured to adjust an angle of inclination of the seat back. The operator input device is configured to received operator commands for movement of the vehicle seat. The control circuit is configured to receive the operator commands and to control the seat base motor and the seat back motor. The control circuit includes a voltage divider circuit configured to provide a first voltage across the seat base motor and a second voltage across the seat back motor, wherein the first and second voltages are different.

According to another exemplary embodiment, a vehicle seat having an electronic control system includes a track, a seat base coupled to the track, a seat back pivotally coupled to the track, seat base and back input devices, and a control circuit. The seat base has a seat base motor configured to move the seat base forward and backward. The seat back has a seat back motor configured to adjust an angle of inclination of the seat back. The seat base input device is configured to receive operator commands for movement of the seat base. The seat back input device is configured to receive operator commands for movement of the seat back. The control circuit is configured to receive the operator commands and to control the seat base motor and seat back motor. The control circuit is configured to move both the seat base and the seat back in response to receiving a command from the seat back input device and to move the seat base alone in response to receiving a command from the seat base input device.

According to one advantageous feature, the control circuit is configured to move the seat base at a first speed in response to receiving a command from the seat back input device and to move the seat base at a second speed faster than the first speed in response to receiving a command from the seat base input device.

According to another exemplary embodiment, an electronic control system for a vehicle seat comprises a seat base motor, a seat back motor, an operator input device, and a control circuit. The seat base motor is configured to move the seat base forward and backward. The seat back motor is configured to adjust an angle of inclination of the seat back. The operator input device is configured to receive operator commands for movement of the vehicle seat. The control circuit is configured to receive the operator commands and to control a seat base motor and seat back motor. The control circuit is configured to move both the seat base and seat back simultaneously at a ratio of approximately 1 degree of inclination of the seat back to approximately 1.5 millimeters of forward or backward movement of the seat base.

According to another exemplary embodiment, an electronic control system for a vehicle seat includes a seat base motor, a seat back motor, an operator input device, and a control circuit. The seat base motor is configured to move the seat base forward and backward. The seat back motor is configured to adjust an angle of inclination of the seat back. An operator input device is configured to receive operator commands for movement of the vehicle seat. The control circuit is configured to receive the operator commands and to control the seat base motor and seat back motor. The control circuit includes a voltage divider circuit configured to provide a first voltage across the seat base motor and a second voltage across the seat back motor, wherein the first and second voltages are different.

According to one advantageous feature, the control circuit is configured to move both the seat base and seat back simultaneously at a ratio of approximately 1.5 millimeters of forward or backward movement of the seat base to approximately 1 degree of inclination of the seat back.

According to another advantageous feature, the control circuit provides open loop control of the seat base motor and the seat back motor.

BRIEF DESCRIPTION OF THE DRAWINGS

The invention will become more fully understood from the following detailed description, taken in conjunction with the accompanying drawings, wherein like reference numerals refer to like parts, and in which.

DETAILED DESCRIPTION OF EXEMPLARY EMBODIMENTS

Figure 1:
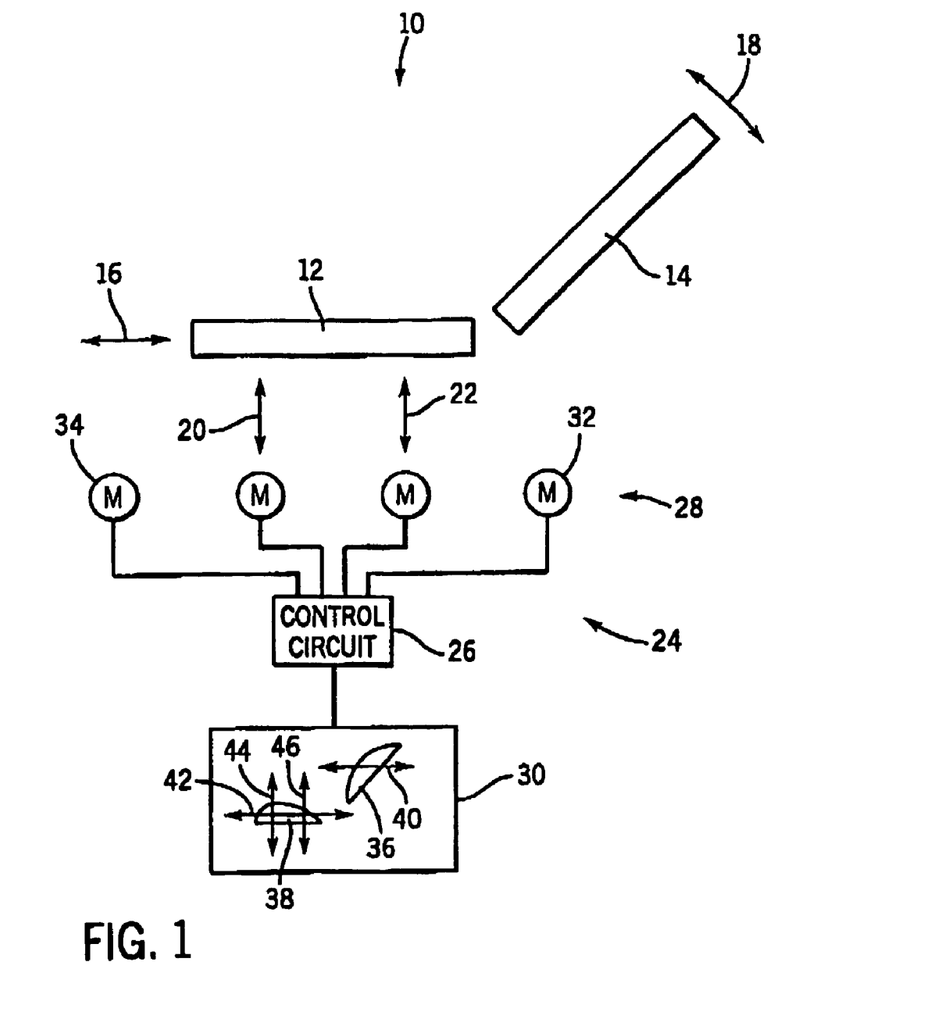
FIG. 1. is schematic drawing of a vehicle seat, according to an exemplary embodiment.

Referring first to FIG. 1, a vehicle seat 10 is shown in an exemplary embodiment. Vehicle seat 10 includes a seat base 12 and a seat back 14. Vehicle seat 10 can be a seat such as that disclosed in U.S. Provisional Application No. 60/356,836 entitled "Automotive Seat With Live Back" to Hancock et al., filed Feb. 12, 2002, which is incorporated by reference herein. Seat base 12 and seat back 14 are coupled to a track, such as an adjuster or other mounting member. Seat base 12 includes a seat base motor (not shown) configured to move the seat base forward and backward, as indicated by arrow 16. Seat back 14 includes a seat back motor (not shown) configured to adjust an angle of inclination, as indicated by arrow 18, of seat back 14. Vehicle seat 10 can further include motors configured to adjust the vertical height of seat base 12 (arrow 20) and the back of seat base 12 (arrow 22).

An electronic control system 24 for vehicle seat 10 includes a control circuit 26, a plurality of motors 28, and an operator input device 30. Motors 28 include seat back motor 32 configured to adjust the angle of inclination of seat back 14 and seat base motor 34 configured to move the seat base forward and backward. Motors 28 can be any of a number of different motor types, such as direct current motors, servo motors, electromagnetic control motors, etc.

Control circuit 26 includes circuit elements needed to drive motors 28 and to receive commands from operator input device 30. Control circuit 26 can include analog and/or digital circuit elements, and can include a digital processor, such as, a microprocessor, microcontroller, application specific integrated circuit (ASIC), etc. Control circuit 26 is configured to drive motors 28 using pulse-width modulated signals, direct current signals, or other control signals.

Operator input device 30 is shown in schematic form having a seat back button 36 and a seat base button 38. Each of buttons 36 and 38 instructs the user that the button is for the control of seat back 14 and seat base 12, respectively, by an applicable icon or, in this exemplary case, by shaping the button to correspond generally to a seat base or a seat back. In this manner, the user understands which button is for control of which portion of vehicle seat 10. Seat back button 36 is configured to be moved forward and backward as indicated by arrow 40 to adjust the angle of inclination of seat back 14 via control circuit 26 and seat back motor 32. Seat base button 38 is configured to adjust the forward and backward (fore-aft) position of seat 12 as indicated by arrow 42 and is further configured to move the front and back of seat base 12 upward and downward, selectively, as indicated by arrows 44 and 46. Operator input device 30 is an "8-way" switch in this exemplary embodiment, but may alternatively be a 6-way switch, or other switches.

Electronic control system 24 is configured in this exemplary embodiment to receive operator commands via input device 30 and to control motors 28. According to one advantageous embodiment, control circuit 26 includes a "power glide" feature wherein seat base 12 and seat back 14 are both moved in response to receiving a command from seat back button 36. Desirably, control circuit 26 is configured to move seat base 12 at a slower speed when receiving a command from seat back button 36 than when moving seat base 12 in response to a command from seat base button 38. Generally, it is desirable to move the seat base 12 a distance that is proportional to the distance which the seat back 14 has moved. One way to accomplish this is to simultaneously move seat base 12 and seat back 14 so that seat base 12 moves at a speed that is proportional to the speed of seat back 14. It has been found that a desirable relationship of movement between seat back 14 and seat base 12 to provide a "glide" effect includes moving seat base 12 and seat back 14 simultaneously at a ratio of approximately 1.5 millimeters (mm) of forward or backward movement of seat base 12 to approximately one degree of inclination of seat back 14. The ratio may alternatively be any value between 1 mm and 4 mm, or desirably between 1.5 mm and 3 mm, of forward or backward movement of seat base 12 to approximately one degree of inclination of seat back 14.

The "power glide" may provide a number of desirable effects. For example, the "power glide" feature of moving both seat base 12 and seat back 14 simultaneously in response to actuation of seat back button 36 may provide improved user comfort and avoids multiple repositioning commands which would otherwise be needed to place the vehicle seat in an optimal seating position. In the situation where the user is driving the vehicle, the "power glide" feature also may advantageously allow the user to keep his or her hands on the steering wheel and eyes on the road in relatively the same position as before the seat back 14 was reclined. Also, the "power glide" feature may keep the user's lower back against the seat during and after recline of seat back 14 without the user having to change their posture. In vehicles equipped with a personal occupant detection system, the system may be more robust because the "power glide" feature may keep the user in and against the seat. It should be understood that the present application is not limited to embodiments that either do or do not produce one or more of the above desirable effects.

In this embodiment, movement of seat base 12 during the "power glide" movement is at a speed slower than that of movement outside of the "power glide" feature. Thus, if the user actuates seat base button 38 along the direction of arrow 42, seat base 12 will move at a speed faster than that during movement according to the power glide feature. Likewise, movement of seat base 12 in the direction of arrows 20 and 22 will also provide the faster movement. In this exemplary embodiment, seat back 14 cannot be moved without movement of seat base 12, unless seat back 14 has reached a mechanical or preset limit to its angle of inclination. Alternatively, seat back 14 cannot be moved without movement of seat base 12, unless seat base 12 has reached a mechanical or preset limit to the range of forward and backward movement.

Typically, a vehicle seat is mounted in a vehicle so that the seat base 12 is not horizontal. For example, a vehicle seat in an automobile may be mounted so that the seat base 12 has an approximately 6 degree forward incline. In this situation, the seat base 12 will be assisted by gravity as it moves backward and will be hindered by gravity as it moves forward. This may cause the seat base 12 to move backward at a faster speed than it moves forward. Accordingly, in one embodiment, the electronic control system 24 may include a measuring device (not shown) configured to measure the speed and/or position of seat back 14 as the angle of inclination changes. The speed and/or position of the seat back 14 is input into control circuit 26 so that the speed and/or position of the seat base 12 can be controlled to be proportional to the speed of the seat back 14. This may be accomplished using a proportional feedback control loop. The measuring device may be a potentiometer, Hall effect sensor, or other like devices that can measure the speed and/or position of seat back 14. Alternatively, it may be desirable to measure the speed of the seat base 12 as it moves and control the speed of the seat back 14 to maintain the desired proportional relationship between the speed of the two devices.

Figure 2:
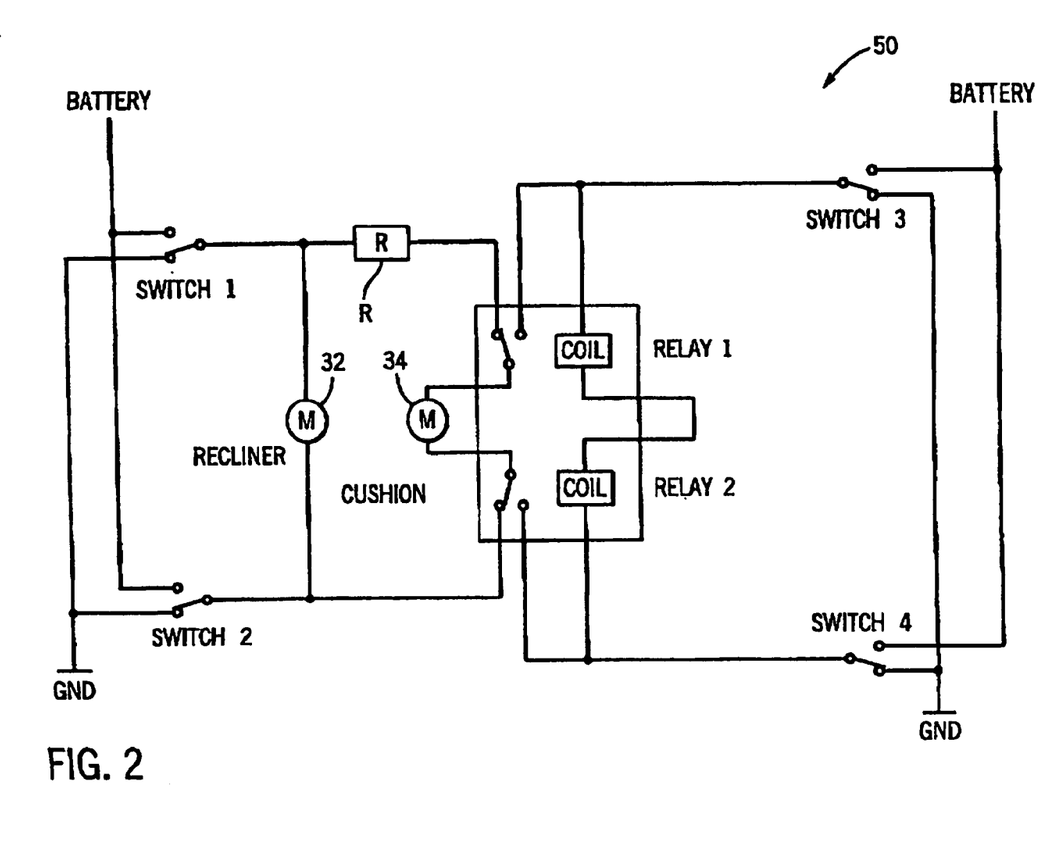
FIG. 2 is a schematic drawing of an electronic control system for a vehicle seat, according to an exemplary embodiment.

Referring now to FIG. 2, an exemplary embodiment of control circuit 26 will now be described as control circuit 50. Control circuit 50 includes four switches, switch 1, switch 2, switch 3, and switch 4. Control circuit 50 further includes relay 1, relay 2, and a resistor R. Resistor R has a resistance of between 1 and 3 Ohms, desirably 2 Ohms, and is rated for approximately 50 watts, but may alternatively have other resistance and power characteristics. Seat back motor 32 (or recliner motor) is disposed parallel with resistor R and seat base motor 34 (or cushion motor). Relay 1 is configured to switch one terminal of seat base 34 between resistor R and switch 3. Relay 2 is configured to switch a second terminal of seat base motor 34 between switch 2 and switch 4. Each of switches 1, 2, 3, and 4 is configured to select either battery or ground from a vehicle power source to motors 32, 34 and relays 1, 2. Switches 1 and 2 are connected to seat back button 36 and cannot be activated at the same time. Switches 3 and 4 are connected to seat base button 38 and cannot be activated at the same time. When recliner button 36 is moved forward (FIG. 1, arrow 40), switch 1 connects the battery to the terminal between motor 32 and resistor R to drive seat back 14 forward. The power from the battery is provided through resistor R to seat base motor 34 to drive seat base motor 34 at a speed of approximately 1.5 millimeters per degree of inclination of seat back 14. Thus, resistor R is part of a voltage divider network configured to provide a first voltage across motor 32 and a second, smaller voltage across motor 34. In response, motor 32 moves at a regular speed and motor 34 moves at a reduced speed from its regular speed. When seat back button 36 is moved backward (FIG. 1, arrow 40), switch 2 provides power from the battery to the other terminal of seat back motor 32 to drive seat back 14 backward. Switch 2 also provides the battery power to seat base motor 34 through relay 2 and relay 1 and resistor R to move seat base 12 forward at a speed of 1.5 millimeters per degree of inclination of seat back 14.

When seat base button 38 is moved backward (FIG. 1, arrow 42), switch 3 provides battery power to a coil of relay 1 which switches the input to seat base motor 34 from resistor R to switch 3 and switches the other terminal of seat base motor 34 from switch 2 to switch 4 via a coil of relay 2. Since vehicle power is provided directly through motor 34 (i.e., not via resistor R), motor 34 is driven at a faster, regular speed than when power was provided through resistor R. Seat base motor 34 drives seat base 12 backward and seat back motor 32 is not driven, whereby seat back 14 does not move.

When seat base button 38 is moved forward (FIG. 1, arrow 42), switch 4 provides power from the battery through the coils of relay 2 and relay 1 to connect the terminals of seat base motor 34 to switches 3 and 4. Power returns through switch 3 to ground, thereby driving seat base 34 in the forward direction at the faster, regular speed. When switches 1 and 3 are activated simultaneously, indicating a command to move seat back forward and seat base 12 backward, relays 1 and 2 are activated, and both motors 32 and 34 are actuated at full speed to carry out the user command. If switches 1 and 4 are activated simultaneously, again relays 1 and 2 are activated such that both commands are carried out at full speed. Likewise, if switches 2 and 3 or switches 2 and 4 are activated (corresponding to user commands of seat back 14 backward and seat base 12 backward, and seat back 14 backward and seat base 12 forward, respectively), movement of motors 32 and 34 is carried out at regular speed, because resistor R is not included in the circuit for providing power from battery to ground through motors 32 and 34.

Figure 3:
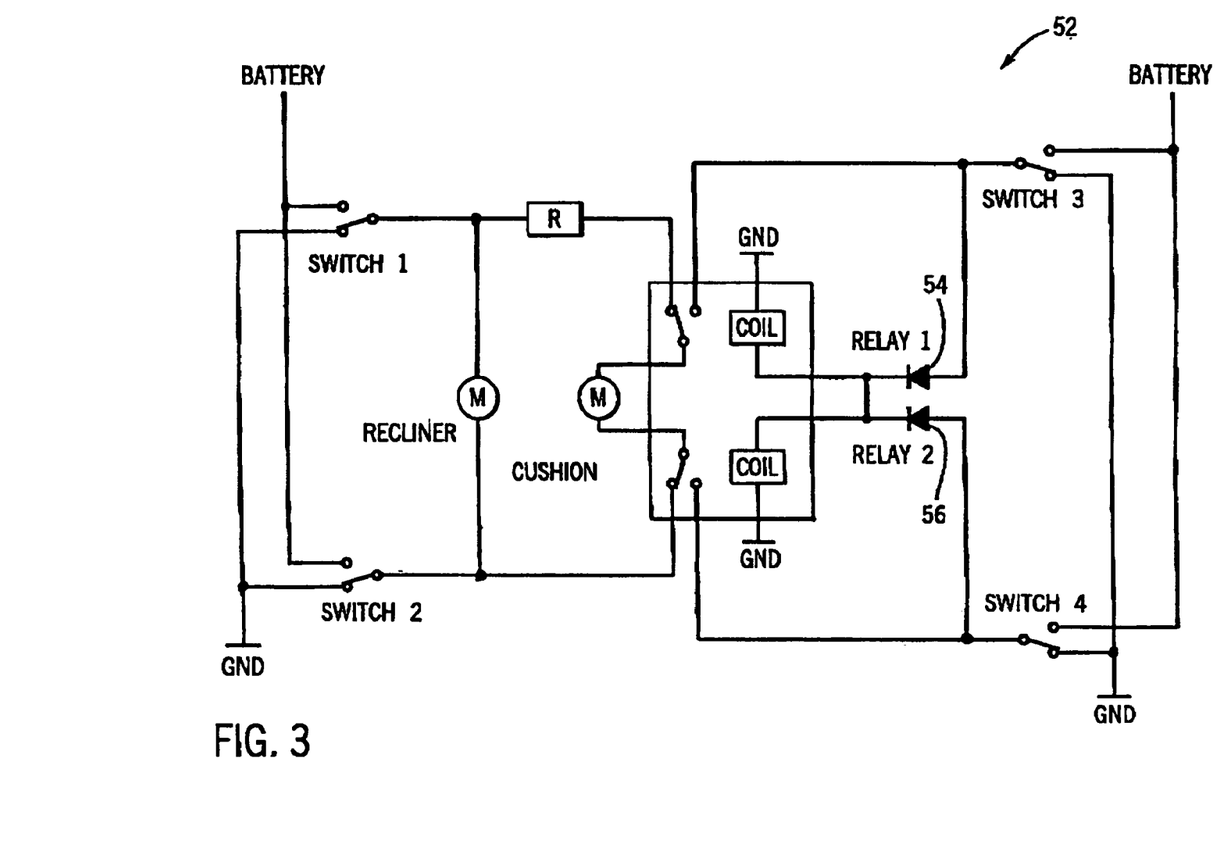
FIG. 3 is a schematic drawing of an electronic control system for a vehicle seat, according to another exemplary embodiment.

Referring now to FIG. 3, a schematic diagram of a control circuit 52 according to an alternative embodiment is shown. Control circuit 52 is the same as control circuit 50, except that switch 3 is coupled to the coil of relay 1 through a diode 54 and switch 4 is coupled to a coil of relay 2 through a diode 56. The anodes of diodes 54 and 56 are coupled to switches 3 and 4, respectively, and the cathodes of diodes 54 and 56 are coupled together and to the coils of relays 1 and 2. The opposite ends of the coils of relays 1 and 2 are coupled to ground. Diodes 54 and 56 protect the relay coils from turn-on and turn-off voltage transients from motor 34 (also referred to as inductive kick).

Figure 4:
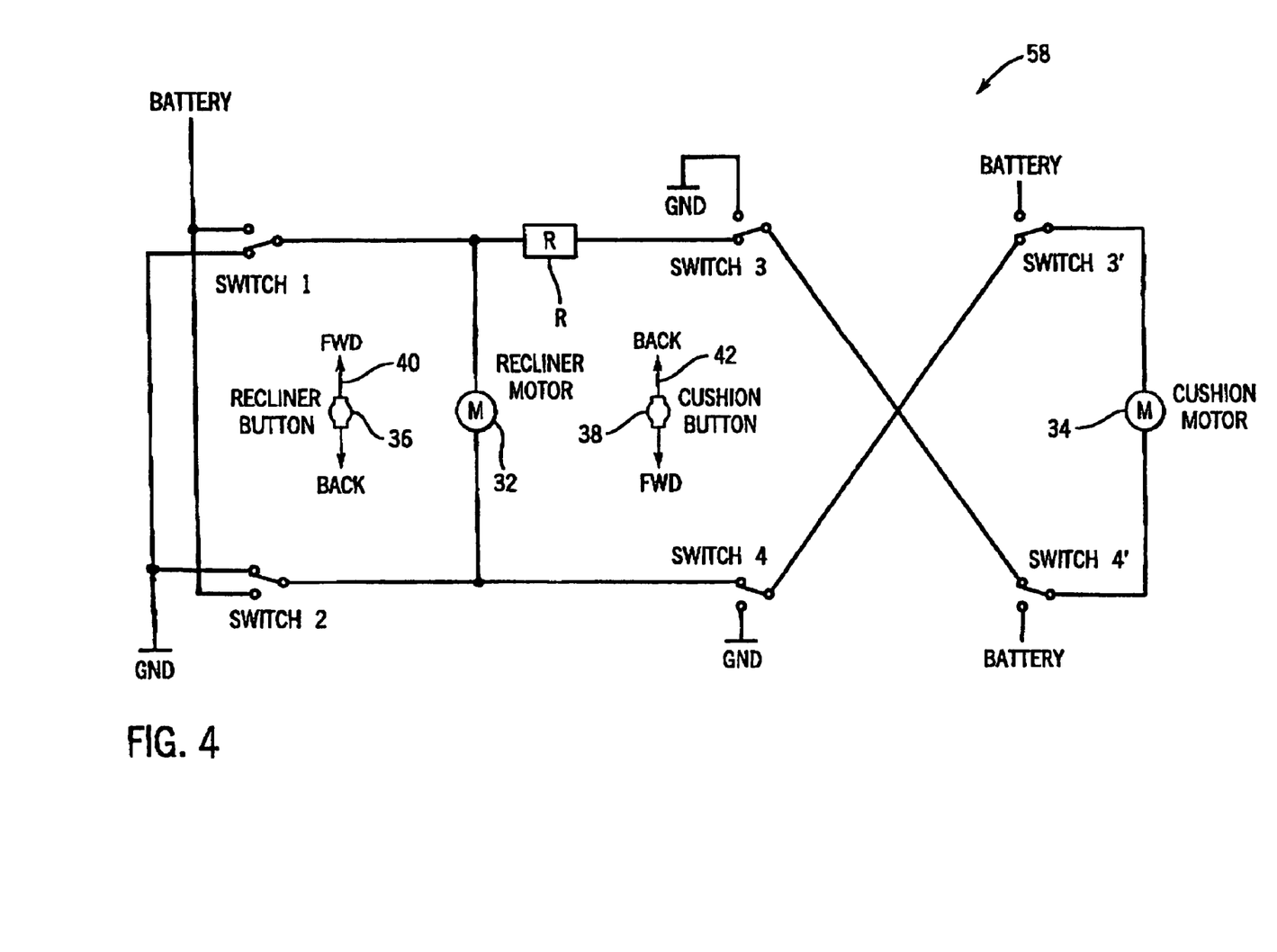
FIG. 4 is a schematic drawing of an electronic control system for a vehicle seat, according to another exemplary embodiment.

Referring now to FIG. 4, a further exemplary embodiment of control circuit 26 is shown as control circuit 58. In this embodiment, relays 1 and 2 of the embodiments of FIGS. 2 and 3 are replaced with two additional switches, switch 3' and switch 4'. Each of switches 1, 2, 3, 3', 4, and 4' are illustrated in this drawing and in the other drawings of the present application in their rest or sleep state, also called the non-activated state. Seat back button 36 is illustrated and includes arrow 40 indicating that forward movement of button 36 corresponds to actuation of switch 1 and backward movement of button 36 corresponds to actuation of switch 2. Likewise, seat base button 38 is illustrated along with arrow 42, indicating that backward movement of button 38 corresponds to actuation of switches 3 and 3' and forward movement of button 38 corresponds to actuation of switches 4 and 4'.

In this embodiment, resistor R is coupled between switch 1 and switch 3. Switch 3 selectively couples the other terminal of switch 3 between ground and switch 4'. Switch 4' selectively couples switch 3 to either battery or motor 34. The other terminal of motor 34 is coupled to switch 3'. Switch 3' couples the other terminal of motor 34 selectively to the vehicle battery or to switch 4. Switch 4 couples switch 3' selectively to either ground or switch 2. As in the embodiments of FIGS. 2 and 3, recliner motor 32 is coupled between switch 1 and switch 2, and switches 1 and 2 selectively couple either battery or ground to motor 32 to drive motor 32 in the forward or backward direction.

In operation, switches 1 and 2 are connected to button 36 and cannot be activated at the same time. Switches 3 and 3' are connected together and are activated by backward movement of button 38. Switches 4 and 4' are connected together and are activated by forward movement of button 38. When button 36 is moved forward, switch 1 is activated to provide battery power through motor 32 and to resistor R, switch 3, switch 4', through motor 34, to switch 3', to switch 4, to switch 2 and to ground. In this manner, motor 34 is driven at a reduced speed, preferably 1.5 millimeters per degree movement of motor 32.

When button 36 is moved backward, switch 2 is actuated to couple battery power through motor 32 to switch 1 to ground and to provide battery power through switch 2 to switch 4 to switch 3' through motor 34 to switch 4' to switch 3 through resistor R to switch 1 to ground. In this manner, seat back 36 moves backward and seat base 12 moves forward at a reduced speed.

When button 38 is moved forward, switches 4 and 4' are activated wherein power is provided from switch 4' through motor 34 to switch 3' to switch 4 to ground, thereby moving motor 34 forward at regular speed. If button 38 is moved back, switches 3 and 3' are activated, wherein power is provided from the vehicle battery to switch 3' through motor 34 to switch 4' to switch 3 to ground, thereby moving motor 34 backward at regular speed. If buttons 36 and 38 are both moved forward, motor 32 moves forward at full speed and motor 34 moves forward at full speed. If buttons 36 and 38 are moved backward or some combination of forward and backward, motors 32 and 34 are moved together simultaneously at regular speed.

Figure 5:
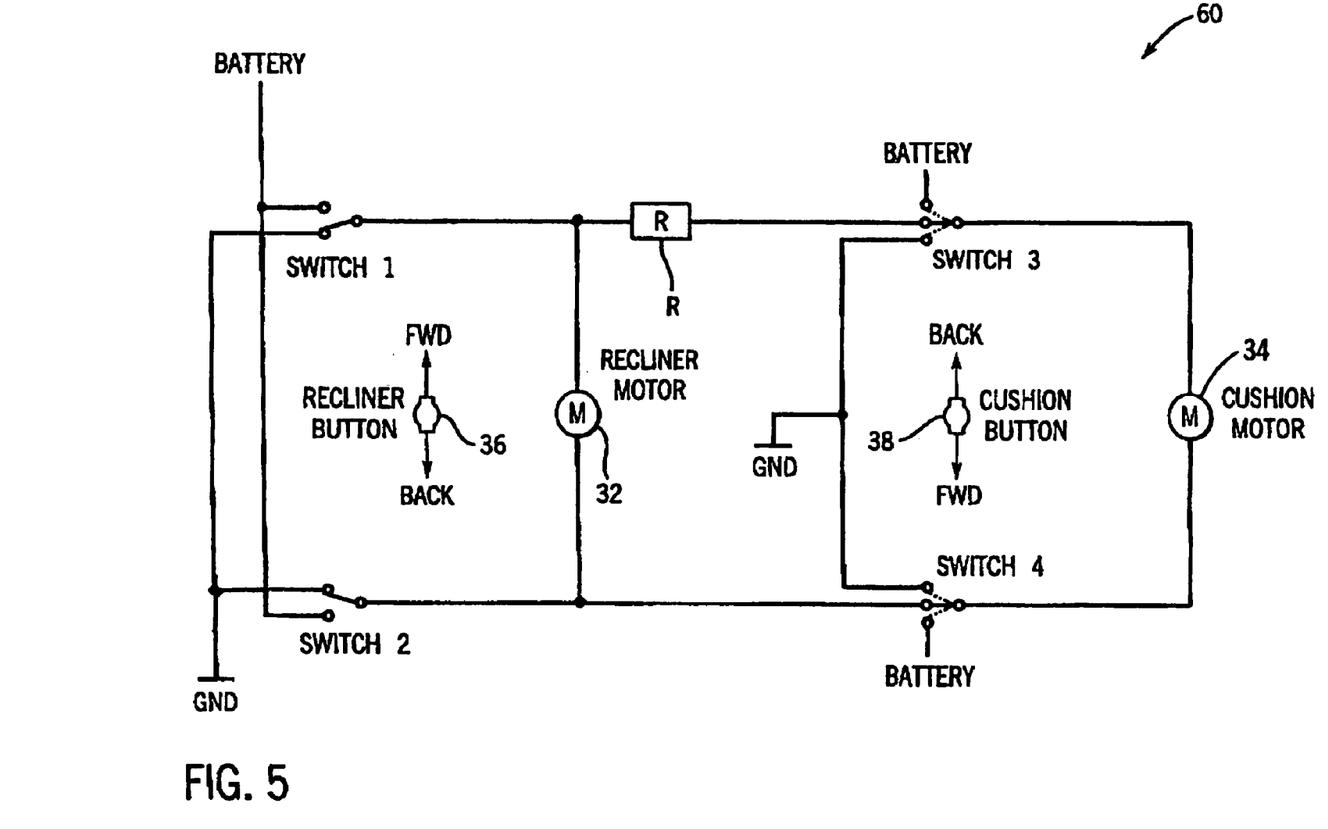
FIG. 5 is a schematic drawing of an electronic control system for a vehicle seat, according to another exemplary embodiment.

Referring now to FIG. 5, another exemplary embodiment of control circuit 26 is shown as control circuit 60. In this embodiment, switches 3 and 3' and switches 4 and 4' of the embodiment of FIG. 4 are replaced with 3-way switches, wherein switch 3 couples one terminal of motor 34 to battery power, to ground, or to resistor R. Likewise, switch 4 is configured to couple the other terminal of motor 34 to battery power, to ground, or to the terminal between switch 2 and motor 32. Motors 32 and 34 are disposed in parallel with one terminal shared by resistor R and motor 32. When button 38 is actuated alone, switch 3 provides battery power to motor 34 and switch 4 provides a closed circuit to ground. When button 38 is actuated forward alone, battery power is provided through switch 4 to motor 34 and switch 3 provides a closed circuit to ground. When seat back button 36 is actuated forward or backward, switches 3 and 4 are in their rest state, wherein power is provided to motor 34 only through resistor R, thereby moving motor 34 at a slower speed than when button 38 is actuated alone. Further, when button 38 is actuated simultaneously with button 36, power is provided separately to motors 32 and 34, and not through resistor R, such that both motors are moved at their full, regular speeds in both directions.

Notably, in the embodiments of FIGS. 2–5, resistor R comprises a portion of a voltage divider circuit configured to provide a first voltage across seat base motor 34 and a second voltage across seat back motor 32, wherein the two voltages are different. The difference in voltages can be used to drive motor 34 at a different speed than motor 32, preferably at a slower speed, to provide a power glide feature. Also of note, the circuits of FIGS. 2–5 provide open loop control, wherein no feedback is provided as to the position of motors 32 and 34. According to one alternative embodiment, feedback may be provided to further improve positioning of motors 32 and 34.

Figure 6:
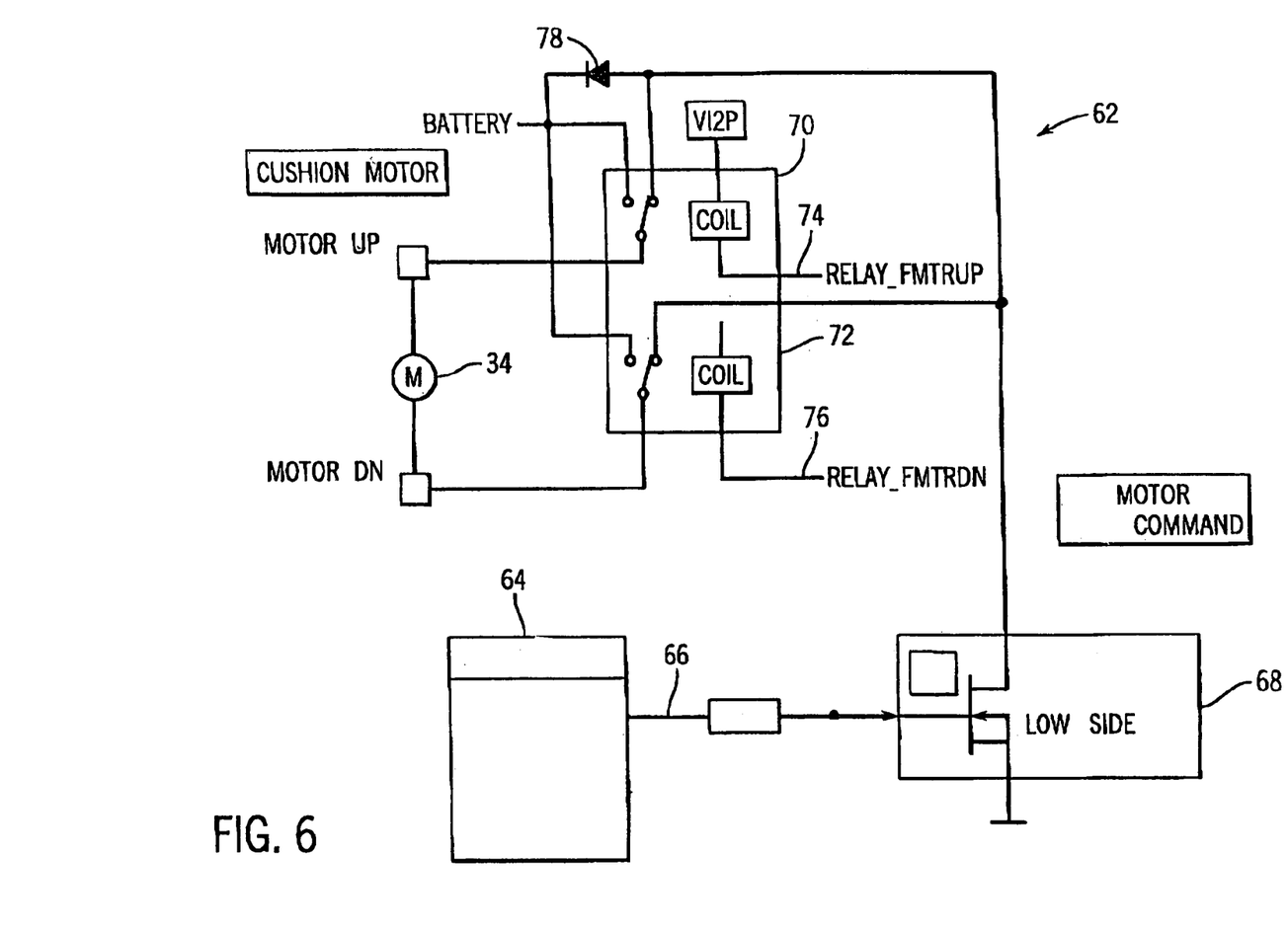
FIG. 6 is a schematic drawing of an electronic control system for a vehicle seat, according to another exemplary embodiment.

Referring now to FIG. 6, an alternative embodiment of control circuit 26 is shown as control circuit 62. In this embodiment, a digital processor, preferably a microprocessor 64 provides control signals to seat base motor 34 and/or seat back motor 32 (not shown). In this embodiment, a pulse-width modulated control signal is provided at microprocessor output 66 to a transistor 68, which is a temperature-protected field effect transistor (FET) in this exemplary embodiment, but may alternatively be other transistors. Transistor 68 is a BTS282Z transistor manufactured by Infineon Technologies, Munich Germany. The temperature protection provides the advantage of protecting the FET from excess heat due to prolonged use or continuous high current use. The source of transistor 68 is coupled to ground and the drain of transmitter 68 is coupled to one input of each of a plurality of relays 70, 72. Relays 70 and 72 are actuated by digital outputs from microprocessor 64 indicated at output 74 and output 76. When seat base button 38 (FIG. 1) is moved forward or backward, digital signals are provided to output 74 or output 76, respectively, to drive relay 70 or 72 to provide power from a vehicle battery source to the motor 34. When seat back button 36 is actuated forward and backward alone, in addition to moving seat back 14, output 74 or 76 is actuated, and an adjustable control signal is provided from microprocessor 64 via output 66 and transistor 68 to provide an amount of power to motor 34 less than that when seat base button 38 is actuated. Consequently, in one embodiment, control circuit 64 is configured to control motor 34 at a slower speed when seat back button 36 is actuated than when seat base button 38 is actuated. Further, the speed ratio is preferably 1.5 millimeters of movement of seat base 12 for every one degree of movement of seat back 14. A diode 78 is provided between a vehicle battery source and transistor 68 for protection of transistor 68 from voltage spikes in the battery.

Figure 7:
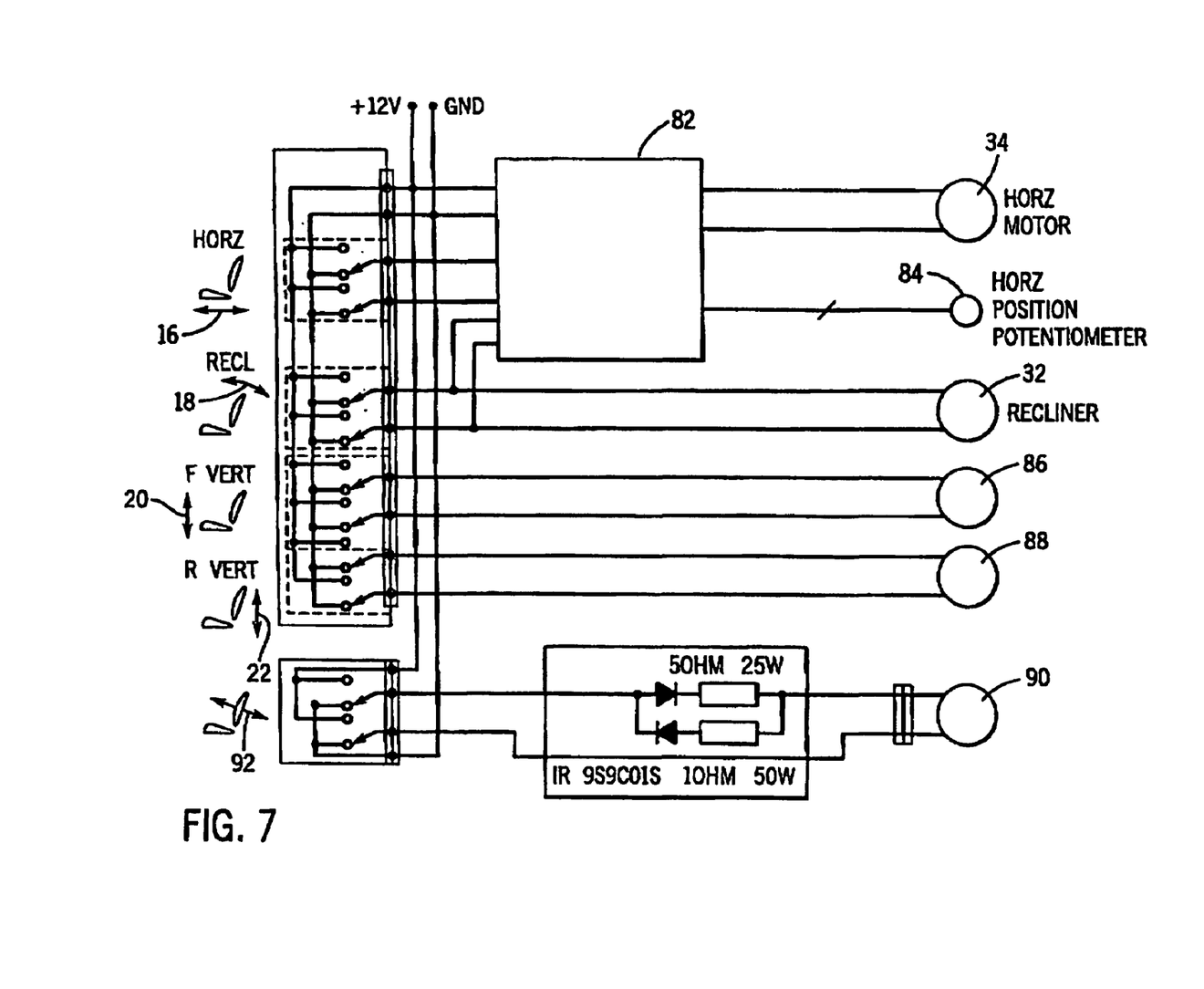
FIG. 7 is a schematic drawing of an electronic control system for a vehicle seat, according to another exemplary embodiment.

Referring now to FIG. 7, an alternative embodiment of control circuit 26 is shown as control circuit 63. Control circuit 63 is an example of a control circuit 26 that may be used on a vehicle seat which includes seat base 12 and seat back 14. Seat base 12 includes a seat base motor 34 configured to move the seat base forward and backward as indicated by arrow 16. Seat back 14 includes a seat back motor 32 configured to adjust an angle of inclination, as indicated by arrow 18, of seat back 14. Seat back 14 also includes tension motor 90 configured to adjust the lumbar portion of the vehicle seat as indicated by arrow 92. Seat base 12 includes front vertical adjustment motor 86 and rear vertical adjustment motor 88 configured to adjust the vertical height of the front and rear portions of seat base 12 as shown by arrows 20 and 22, respectively. A potentiometer 84 is also included which measures the speed at which seat base 12 moves as seat back motor 32 changes the angle of inclination.

In operation, control circuit 63 moves seat base 12 proportionally to seat back 14 at a ratio of between approximately 1 mm to approximately 4 mm, or desirably, between approximately 1.5 mm to approximately 3 mm, to approximately 1 degree change in the angle of inclination. In this embodiment, control module 82 detects when the seat back motor 32 is activated and powers seat base motor 34 so that seat base 12 moves a distance corresponding to the above ratio. This may be done using control module 82 to maintain the speed of seat base 12 at a preconfigured fixed rate so that the position of the seat base 12 is generally proportional to the position of seat back 14 as seat back 14 moves. The speed of seat base 12 may be measured using potentiometer 84. The fixed rate is generally preprogrammed into the control module 82, but alternatively the fixed rate may be set after it leaves the manufacturer. In general, the seat base 12 moves forward when the seat back 14 reclines, and the seat base 12 moves backward when the seat back 14 inclines. Also, in some situations, to counter the effects of gravity, control module 82 may be configured to move seat base 12 backward at a speed that is slower than if seat base 12 was moving forward. Control circuit 63 may also be configured so that seat base motor 34 may be activated alone, in which case, seat base 12 would move at a speed that is faster than the speed at which seat base 12 moves in combination with seat back 14.

In an alternative embodiment, potentiometer 84 or a similar measuring device may be used to measure the position of seat back 14. The position could then be used as the set point for a feed back control loop that maintains the position of seat base 12 proportional to the position of seat back 14 as seat back 14 is adjusted. This may be accomplished by using another potentiometer to measure the position of seat base 12 so that the position of seat base 12 is continually compared to the position of seat back 14 as it moves and seat base 12 is continually adjusted accordingly. Other alternatives and configurations may be used without departing from the scope and spirit of the present disclosure.

What is claimed is:

1. An electronic control system for a vehicle seat comprises:
   a seat base motor configured to move a seat base forward and backward;
   a seat back motor configured to adjust an angle of inclination of a seat back;
   an operator input device configured to receive operator commands for movement of the vehicle seat; and
   a control circuit configured to receive the operator commands and to control the seat base motor and seat back motor;
   wherein the control circuit is configured to move the seat base and the seat back at a ratio of approximately 1 degree of inclination to between approximately 1 mm to approximately 4 mm of forward or backward movement of the seat base.

2. The electronic control system of claim 1 wherein the control system is configured to move the seat back and seat base simultaneously at a ratio of approximately 1degree of inclination to between approximately 1.5 mm to approximately 3 mm of forward or backward movement of the seat base.

3. The electronic control system of claim 1 wherein the ratio is approximately 1 degree of inclination to approximately 1.5 mm of forward or backward movement of the seat base.

4. The electronic control system of claim 1 wherein the seat base moves at a first speed in response to receiving an operator command for movement of the seat back and the seat base moves at a second speed in response to receiving an operator command for movement of the seat base alone, wherein the first and second speeds are different.

5. The electronic control system of claim 4 wherein the first speed is less than the second speed.

6. The electronic control system of claim 1 wherein the seat back can be adjusted through a range of motion so that for a portion of the range of motion the seat back cannot be adjusted without movement of the seat base.

7. The electronic control system of claim 1 wherein the control circuit is configured to move the seat base generally forward in response to an operator command to recline the seat back and to move the seat base generally backward in response to an operator command to incline the seat back.

8. An electronic control system for a vehicle seat comprising:
   a seat base motor configured to move a seat base forward and backward;
   a seat back motor configured to adjust an angle of inclination of a seat back;
   an operator input device configured to receive operator commands for movement of the vehicle seat; and
   a control circuit configured to receive the operator commands and to control the seat base motor and seat back motor;
   wherein the control circuit includes a voltage divider circuit configured to provide a first voltage across the seat base motor and a second voltage across the seat back motor, wherein the first and second voltages are different.

9. The electronic control system of claim 8 wherein the control circuit is configured to move both the seat base and the seat back simultaneously at a ratio of approximately 1 degree of inclination to between approximately 1.5 mm to approximately 3mm of forward or backward movement of the seat base.

10. The electronic control system of claim 8 wherein the first voltage is less than the second voltage.

11. The electronic control system of claim 8 wherein the seat base moves at a first speed in response to receiving an operator command for movement of the seat back and the seat base moves at a second speed in response to receiving an operator command for movement of the seat base alone, wherein the first speed is less than the second speed.

12. The electronic control system of claim 8 wherein the seat back can be adjusted through a range of motion so that for a portion of the range of motion the seat back cannot be adjusted without movement of the seat base.

13. The electronic control system of claim 8 wherein the control circuit is configured to move the seat base generally forward in response to an operator command to recline the seat back and to move the seat base generally backward in response to an operator command to incline the seat back.

14. A vehicle seat having an electronic control system comprising:
   a track;
   a seat base coupled to the track;
   a seat back pivotally coupled to the track;
   a seat base input device configured to receive operator commands for movement of the seat base;
   a seat back input device configured to receive operator commands for movement of the seat back;
   a control circuit configured to receive the operator commands from one or both the seat base input device and the seat back input device and to control the seat base motor and seat back motor;
   a seat base motor configured to move the seat base forward and backward; and
   a seat back motor configured to adjust an angle of inclination of the seat back;
   wherein the control circuit is configured to move the seat base and the seat back in response to receiving a command from the seat back input device; and
   wherein the control circuit is configured to move the seat base alone in response to receiving a command from the seat base input device.

15. The vehicle seat of claim 14 wherein the control circuit is configured to move the seat base substantially proportional to the movement of the seat back when the seat base and seat back are both moving.

16. The vehicle seat of claim 15 further comprising a potentiometer that measures the position of the seat back, wherein the control circuit is configured to maintain the position of the seat base substantially proportional to the position of the seat back.

17. The vehicle seat of claim 15 wherein the control circuit is configured to move both the seat base and the seat back at a ratio of approximately 1 degree of inclination to between approximately 1.5 mm to approximately 3 mm of forward or backward movement of the seat base.

18. The vehicle seat of claim 14 wherein the seat base moves at a first speed in response to receiving an operator command for movement of the seat back and the seat base moves at a second speed in response to receiving an operator command for movement of the seat base alone, wherein the first speed is less than the second speed.

19. The vehicle seat of claim 14 wherein the control circuit is configured to move the seat base generally forward in response to an operator command to pivot the seat back backward and to move the seat base generally backward in response to an operator command to pivot the seat back forward.

20. The vehicle seat of claim 14 wherein the control circuit includes a microprocessor.

* * * * *